(12) United States Patent
Sun et al.

(10) Patent No.: US 9,055,479 B2
(45) Date of Patent: Jun. 9, 2015

(54) SYSTEM AND METHOD FOR MEASUREMENT REPORT TRIGGERING CONFIGURATION FOR MULTIPLE POINT COMMUNICATION MEASUREMENT SET MANAGEMENT

(71) Applicant: Futurewei Technologies, Inc., Plano, TX (US)

(72) Inventors: Yishen Sun, Buffalo Grove, IL (US); Hao Bi, Lake Zurich, IL (US); David Jean-Marie Mazzarese, Beijing (CN); Weimin Xiao, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 99 days.

(21) Appl. No.: 13/847,331

(22) Filed: Mar. 19, 2013

(65) Prior Publication Data

US 2013/0242787 A1    Sep. 19, 2013

Related U.S. Application Data

(60) Provisional application No. 61/612,856, filed on Mar. 19, 2012, provisional application No. 61/779,052, filed on Mar. 13, 2013.

(51) Int. Cl.
*H04W 24/10*    (2009.01)

(52) U.S. Cl.
CPC .................................... *H04W 24/10* (2013.01)

(58) Field of Classification Search
None
See application file for complete search history.

(56) References Cited

U.S. PATENT DOCUMENTS

2009/0086656 A1*    4/2009    Kuchibhotla et al. ......... 370/310

2012/0057527 A1*    3/2012    Ou .................................. 370/328

(Continued)

FOREIGN PATENT DOCUMENTS

EP    2590450 A1    5/2013
EP    2605591 A1    6/2013

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331 V10.4.0, Technical Specification, Dec. 2011, 296 pages.

"LS on CSI-RS based measurement for CoMP," 3GPP TSG-RAN WG1 Meeting #68, TSG RAN WG1, REL-11, Dresden, Germany, Feb. 6-10, 2012, 1 page.

(Continued)

*Primary Examiner* — Kerri Rose
(74) *Attorney, Agent, or Firm* — Slater & Matsil, L.L.P.

(57) ABSTRACT

A method embodiment includes configuring, by a network device, a multiple point communication measurement reporting scheme. The multiple point communication measurement reporting scheme includes a multiple point communication measurement set, a List A, a List B, and measurement report triggering events. The measurement report triggering events includes a first event wherein a measurement result of an element in List A becomes better than a threshold, a second event wherein a measurement result of an element in List A becomes better than a measurement result of an element in List B by at least an offset, a third event wherein a measurement result of an element in List B becomes worse than a threshold, and/or a fourth event wherein a measurement result of an element in List B becomes worse than a measurement result of an element in List A by at least an offset.

25 Claims, 3 Drawing Sheets

(56) References Cited

U.S. PATENT DOCUMENTS

2014/0220963 A1\* 8/2014 Jung et al. .................. 455/422.1
2014/0247742 A1\* 9/2014 Lee et al. ...................... 370/252

FOREIGN PATENT DOCUMENTS

WO 2011020062 A2 2/2011
WO 2011085195 A1 7/2011

OTHER PUBLICATIONS

"Distributed Operation of Enhanced Control Channels," 3GPP TSG RAN WG1 #68bis, Samsung, 7.6.3, Jeju, Korea, Mar. 26-30, 2012, pp. 1-2.
Extended European Search Report received in Application No. 13765213.7-1854 mailed Mar. 26, 2015, 6 pages.

\* cited by examiner

SYSTEM AND METHOD FOR MEASUREMENT REPORT TRIGGERING CONFIGURATION FOR MULTIPLE POINT COMMUNICATION MEASUREMENT SET MANAGEMENT This application claims the benefit of U.S. Provisional Applications: No. 61/612,856, filed on Mar. 19, 2012, entitled "System and Method for Measurement Report Triggering Configuration for CoMP Measurement Set Management" and No. 61/779,052 filed on Mar. 13, 2013, entitled "System and Method for Measurement Report Triggering Configuration for Multiple Point Communication Measurement Set Management", which applications are hereby incorporated herein by reference.

TECHNICAL FIELD

The present invention relates to a system and method for wireless communications, and, in particular embodiments, to a system and method for measurement report triggering configuration for a multiple point communication system, wherein the measurement report may be used for multiple point communication measurement set management.

BACKGROUND

Generally, multiple point transmission is considered for wireless networks as a tool to increase high data rates coverage, cell-edge throughput, and/or system throughput in both high-load and low-load scenarios. For example, coordinated multiple point (CoMP) transmissions/receptions may be implemented in long-term evolution-advanced (LTE-Advanced) networks to improve coverage and throughput for both uplink and downlink. Downlink CoMP relates to dynamic coordination among multiple geographically-separated transmission points to transmit data to a user equipment (UE). Uplink CoMP uses uplink coordinated multiple point reception, which relates to coordination among multiple, geographically-separated points to receive uplink transmissions from a UE.

As part of the multiple point communication schemes, a network evaluates and decides which communication points or combined communication points to communicate data on. Because selection of communication points under traditional schemes focused on selecting particular communication points and not groups of combined geographically-isolated communication points, a new method for identifying and evaluating candidate communication points in a multiple point communication scheme is required. One possible multiple point communication scheme involves the timely and efficient reporting of measurement results for use in determining candidate communication points. This scheme may be achieved through event-triggered measurement reporting.

SUMMARY OF THE INVENTION

These and other problems are generally solved or circumvented, and technical advantages are generally achieved, by preferred embodiments of the present invention which provide system and method for measurement report triggering configuration for a multiple point communication system, wherein the measurement report may be used for multiple point communication system measurement set management.

In accordance with an embodiment, a method for multiple point communication includes configuring, by a network device, a multiple point communication measurement reporting scheme for a user equipment (UE). The multiple point communication measurement reporting scheme includes a multiple point communication measurement set, a List A, a List B, and one or more measurement report triggering events. Each of the one or more measurement triggering events is one of a first event wherein a measurement result of a first element in the List A becomes better than a first threshold, a second event wherein a measurement result of a second element in the List A becomes better than a measurement result of a third element in the List B by at least a first offset, a third event wherein a measurement result of a fourth element in the List B becomes worse than a second threshold, or a fourth event wherein a measurement result of a fifth element in the List B becomes worse than a measurement result of a sixth element in the List A by at least a second offset. The UE is configured to perform a first type of network measurement on elements in the List A and the List B and a second type of network measurement on elements in the multiple point communication measurement set, the first type of network measurement being different from the second type of network measurement.

In accordance with another embodiment, a method for multiple point communication includes performing, by a user equipment (UE), a first type of network measurements on a first and second plurality elements in a List A and a List B respectively. The UE also performs a second type of network measurement on a third plurality of elements in a multiple point communication measurement set, wherein the first type of network measurement is different from the second type of network measurement. The UE also transmits, to a network device, a measurement report including one or more results of the first type of network measurement when a measurement report triggering event occurs. The measurement report triggering event is one of a first event wherein a measurement result of a first element in the List A becomes better than a first threshold, a second event wherein a measurement result of a second element in the List A becomes better than a measurement result of a third element in the List B by at least a first offset, a third event wherein a measurement result of a fourth element in the List B becomes worse than a second threshold, or a fourth event wherein a measurement result of a fifth element in the List B becomes worse than a measurement result of a sixth element in the List A by at least a second offset.

Other embodiments are also included.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Various embodiments are described in a specific context, namely a coordinated multiple point (CoMP) transmission and/or reception scheme evaluating channel quality using channel state information reference signal (CSI-RS) resources. Various embodiments may also be applied, however, to other forms of multiple point communication schemes utilizing CSI-RS or other evaluation resources such as cell-specific reference signal (CRS), and the like. Various embodiments may be applied to wireless network systems and devices, such as long-term evolution (LTE) networks and devices (e.g., base stations, evolved nodeBs, and the like).

Figure 1:
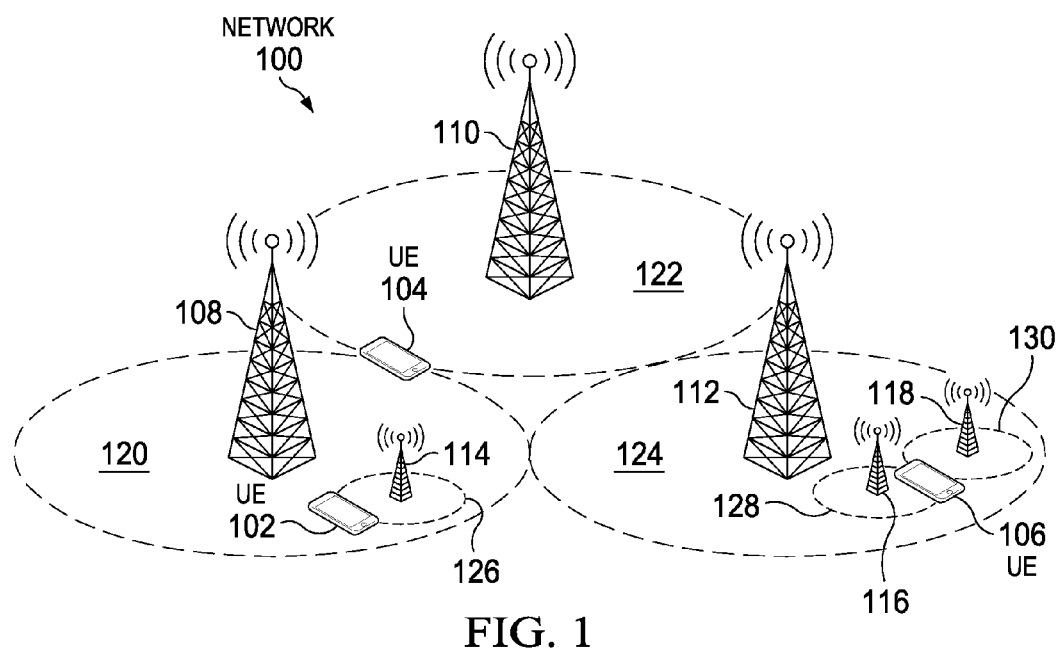
FIG. 1 illustrates a block diagram of a multiple point communication system in accordance with various embodiments.

FIG. 1 illustrates a portion of a network 100 implementing a multiple point, such as a coordinated multiple point (CoMP), transmission/reception scheme. Network 100 supports transmissions and receptions involving a plurality of user equipment (UEs) 102-104. Network 100 includes a plurality of minimum communication elements (MCEs) 108-118. MCEs 108-118 represent the minimum communication entity whose channel quality may be measured by network 100 through a configured resource (e.g., a channel state/statistical information reference signal (CSI-RS)) as explained in greater detail in subsequent paragraphs. For ease of illustration, FIG. 1 shows MCEs 108-112 as macro eNodeBs and MCEs 114-118 as pico eNodeBs. However, MCEs 108-118 may also be transmission points, wherein each transmission point corresponds with a set of geographically co-located physical antennas (e.g., remote radio heads, remote radio units, and the like). Furthermore, MCEs 108-118 may also be a port or a group of ports of a transmission point, a base station (BS), an evolved nodeB, or the like.

MCEs 108-118 provide communication coverage for areas 120-130 respectively. Coverage areas 120-130 may vary in size, and, therefore, the corresponding MCEs 108-118 may be a macrocell, a microcell, a picocell, or the like. As illustrated by FIG. 1, UE 102 is within the coverage area of both MCE 108 (coverage area 120) and MCE 114 (coverage area 126). Therefore UE 102 may receive downlink data transmissions from both MCEs 108 and 114 simultaneously under a proper coordination scheme. It is also possible for uplink data transmissions from UE 102 to be received by either or both MCEs 108 and 114 successfully. Similarly, CoMP communications are possible between UE 104 and MCES 108 and 110 as well as between UE 106 and MCEs 112, 116, and 118. Although FIG. 1 illustrates six MCEs 108-118 as three macrocells 108-112 and three picocells 114-118 serving three UEs 102-106, network 100 may be configured in alternative embodiments to serve a varying number of UEs with a varying number of MCEs, each providing communication coverage for geographic areas of varying sizes.

An aspect of multiple point communications, such as CoMP transmissions/receptions, is selecting the MCE or group of MCEs to conduct uplink receptions or downlink transmissions for a particular UE. As part of the MCE selection process, a network (e.g., network 100) evaluates the channel quality between a UE (e.g., UE 106) and relevant MCEs (e.g., MCEs 112, 116, and 118).

Typically, the evaluation process involves mapping various relevant MCEs to various resources (e.g., CSI-RS resources). Relevant MCEs refer to the MCEs a UE could potentially transmit on. CSI-RS resources are time-frequency resources within one or multiple subcarriers and one or multiple orthogonal frequency division multiplexing (OFDM) symbols. The multiple subcarriers may or may not be consecutive in frequency, and the multiple OFDM symbols may or may not be consecutive in time. A UE may evaluate the channel quality of a MCE or group of MCEs by receiving a transmission from the MCE or group of MCEs on a CSI-RS resource and comparing the received transmission with a reference.

Generally, a UE may perform at least two different types of network measurements on resources corresponding to MCEs to evaluate channel quality. For example, a UE may perform two types of CSI-RS based received signal measurements: radio resource management (RRM) (e.g., reference signal received power (RSRP)) measurements and channel state/statistical information (CSI) measurements. The first type of network measurements (e.g., RSRP measurements) provides information on average, long-term channel quality, whereas the second type of network measurement (e.g., CSI measurements) provides information on dynamic, up-to-date channel quality. For ease of description, this disclosure will describe the two types of network measurements in a specific context, namely first type of network measurement as a RSRP measurement and the second type of network measurement as a CSI measurement. However, various alternative embodiments may be applied to other forms of network measurements on channel quality.

Because RSRP measurements incur lower network costs than CSI measurements, a UE may perform RSRP measurements on a set of all CSI-RS resources for which CSI-RS based received signal measurements (e.g., RSRP and CSI) can be made and reported to the network. The set of all CSI-RS resources for which CSI-RS based received signal measurements can be made may be referred to as a multiple point communication resource management set. This multiple point communication resource management set may be a CoMP resource management (CRM) set (sometimes also referred to as a CoMP RRM measurement set).

Based on the RSRP measurements of the multiple point communication resource management set (e.g., a CRM set), the network configures and manages a multiple point communication measurement set for the UE. The multiple point communication measurement set may be a CoMP measurement set. The CoMP measurement set may be a set of time frequency resources (e.g., CSI-RS resources) that the UE should conduct and/or report CSI measurements on. The network may use the CSI measurements on the CoMP measurement set as a factor in selecting the appropriate MCE or combined MCEs to transmit on. The CoMP measurement set generally relates to the resources in the CRM set identified as having good RSRP measurements. The criteria for determining a good RSRP measurement may vary depending on the configuration of a network. Alternatively, the multiple point communication measurement set (e.g., CoMP measurement set) may include elements corresponding to one or more MCEs. The elements may be resources, resource IDs, MCEs, combinations thereof, or the like.

In order to keep network costs low, the size of a CoMP measurement set may be quite limited. For example, a CoMP measurement set may only have two or three elements. Therefore, while the CoMP measurements set may be related to the CRM set, the two sets may be independent in order to minimize the required number of CSI measurements.

For example, CSI-RS resources B1-B4 in a CRM set are identified as having good RSRP measurements. Resources B1-B4 correspond to MCE1-MCE4 respectively (i.e., MCE1-MCE4 are candidate MCEs that the network and UE may conduct CoMP transmissions on). The network may configure a CoMP measurement set to include resource A1 corresponding to a combined transmission from MCE1, MCE2, and MCE3 and resource A2 corresponding to MCE4. In this example, resource B4 and A2 may be the same resource. Therefore, elements in a CoMP measurement set are related to elements from a corresponding CRM set, but the CoMP set is not necessarily a subset of the CRM set.

In an alternative example, the two sets may be completely independent. That is, the CRM set may include resources B1-B4 corresponding with MCE1-MCE4 respectively, wherein resources B1-B4 have been identified as good resources. In contrast, the CoMP measurement set may include resource A1 (corresponding to MCE1+MCE2) and resource A2 (corresponding to MCE3+MCE4). In subsequent paragraphs, MCEx+MCEy may be used to denote a combined, joint transmission from two MCEs, MCEx and MCEy.

The network configures and updates the CoMP measurement sets for each UE. That is, the CoMP measurement sets are UE-specific. CoMP measurement sets are configured and updated based on the network receiving CSI-RS based measurement reports from a UE. The management of CoMP measurement sets includes at least two basic operations: the addition of a CSI-RS resource and the removal of a CSI-RS resource. A third basic operation may also be performed by the network: the reconfiguration of an existing CSI-RS resource. The reconfiguration of an existing CSI-RS resource corresponds to the remapping of a MCE or a group of MCEs to a CSI-RS resource. For example, CSI-RS resource A1 in a CoMP measurement set may initially correspond to MCE1. Subsequently, the network may reconfigure CSI-RS resource A1 to correspond to MCE1+MCE2.

Figure 2:
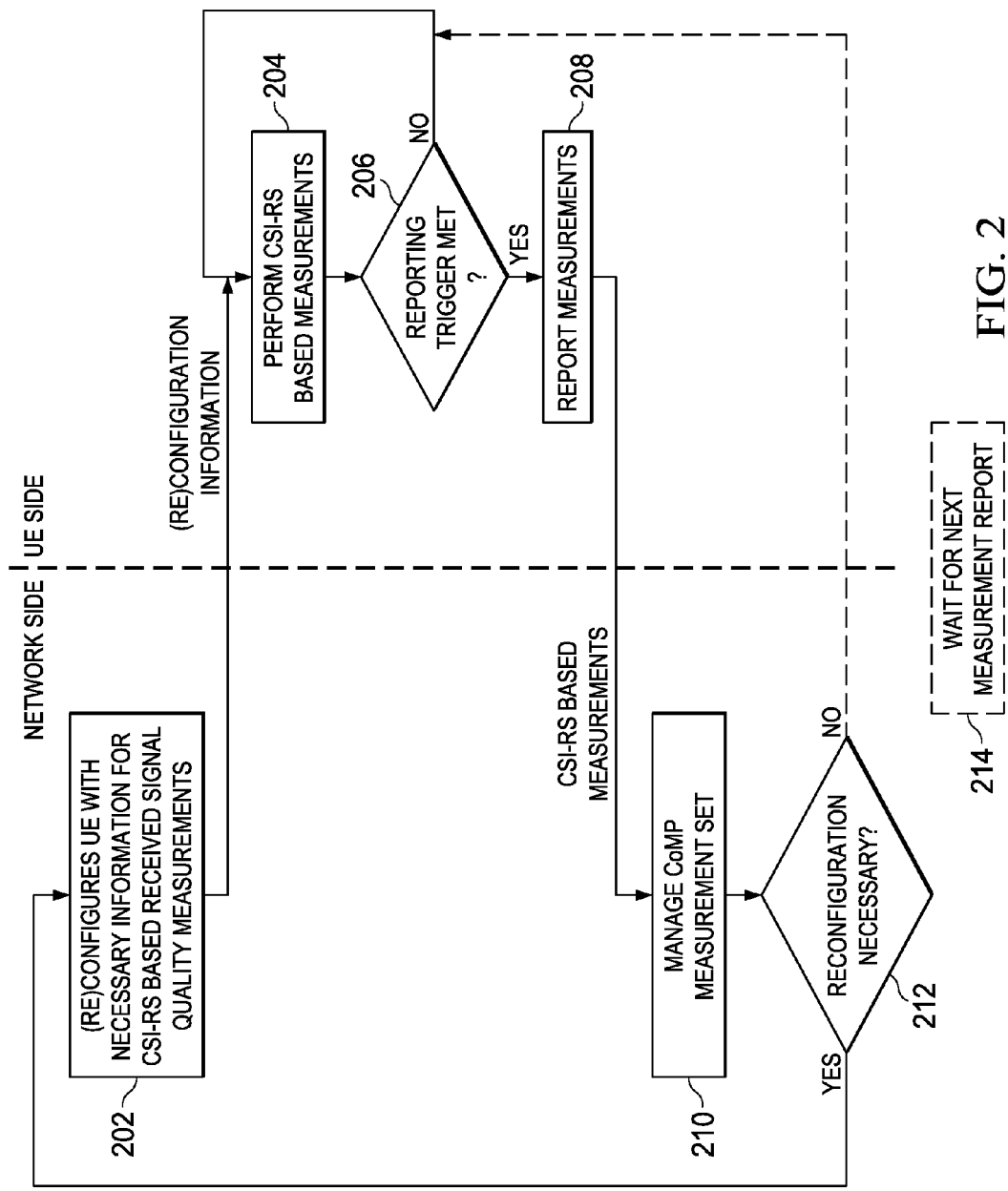
FIG. 2 illustrates a flow diagram of network and user equipment (UE) activity in accordance with various embodiments.

FIG. 2 illustrates a flow diagram of network and UE activity for CoMP measurement set management. In step 202, a network configures (or reconfigures) a UE with necessary information for CSI-RS based received signal quality measurements. This information may include which CSI-RS resources to measure, the elements of the CoMP measurement set and the CRM set respectively, measurement reporting triggers (i.e., event definitions that triggers the UE to report CSI-RS measurements), values of thresholds and/or offsets that are referenced in the event definitions, the maximum number of resources that may be reported in one measurement report, how often measurements should be made, and the like. The network signals this information to the UE using, for example, radio resource control (RRC) messaging.

In step 204, the UE performs CSI-RS based measurements in accordance with the configuration information received from the network. In particular, the UE may perform RSRP measurements for CSI-RS resources in the CRM set. The UE may only perform CSI measurements on CSI-RS resources in the CoMP measurement.

In step 206, the UE evaluates the measurement data and determines if any reporting triggers have been met. Reporting triggers are defined by the network, in step 202, as situations when the UE should report CSI-RS based measurements back to the network. For example, a particular RSRP measurement for a CSI-RS resource may indicate a need to reconfigure the CoMP measurement set. Therefore, when the UE identifies this type of measurement, a reporting trigger may be met and the UE reports the CSI-RS measurements to the network in step 208 using, for example, RRC signalling. Alternatively, the UE may only report a subset of all the CSI-RS measurements taken. If the UE determines no reporting triggers are met, the UE waits a set period of time to evaluate the next CSI-RS based measurements. Because the UE may only report CSI-RS based measurements if a reporting trigger is met, signalling and consumed network resources may be reduced. The definition of reporting triggers will be described in greater detail in subsequent paragraphs.

In step 210, the network manages the CoMP measurement set in accordance with the reported CSI-RS based measurements. For example, the network may add a CSI-RS resource to the CoMP measurement set, remove a CSI-RS resource from the CoMP measurement set, and/or reconfigure a CSI-RS resource in the CoMP measurement set. The reporting of CSI-RS based measurements does not necessarily cause a change in the CoMP measurement set. Management of the CoMP measurement set and the criteria involved may vary depending on network configuration.

In step 212, the network determines if reconfiguration of the information used by UE for CSI-RS based received signal quality measurements is necessary (e.g., if any changes have been made to the CoMP measurement set). If not (e.g., no change was made to the CoMP measurement set), then in step 214, the network simply waits for the next CSI-RS based measurement report from the UE. The network may not signal anything to the UE if no reconfiguration is necessary. However, if reconfiguration is necessary, then the network signals the appropriate information to the UE using, for example, RRC signalling.

The UE may also report the measurement results of the CoMP measurement set. The measurements that are performed on the resources in the CoMP measurement set are CSI measurement, not RSRP measurements. This measurement reporting may or may not be related to the reporting triggers. The network may use the CSI measurements results on the CoMP measurement set as a factor when making a scheduling decision. As previously discussed, the CoMP measurement set may be a set of time-frequency resources (e.g., CSI-RS resources) mapped to one or more MCEs. The MCEs measured by the CoMP measurement set may or may not be engaged in uplink/downlink communications with the UE. The network may use measurement results on the resources in the CoMP measurement set to determine candidate MCEs to schedule transmissions on for the UE.

Generally, the purpose of CSI-RS based measurement and reporting of a CRM set is to support CoMP measurement set management. Therefore, it is beneficial to establish triggers for the UE to signal CSI-RS based measurement reports under situations when updates to CoMP measurement set may be needed. In various embodiments, the network configures two lists, List A and List B to facilitate the report triggering process and implements List A and List B in accordance with the following triggering events (Events 1-4) for CSI-RS based measurement reporting.

Event 1: The RSRP measurement result of a CSI-RS resource in List A becomes better than a threshold.

Event 2: The RSRP measurement result of a CSI-RS resource in List A becomes better than that of a resource in List B by at least an offset.

Event 3: The RSRP measurement result of a CSI-RS resource in List B becomes worse than a threshold.

Event 4: The RSRP measurement result of a CSI-RS resource in List B becomes worse than that of a resource in List A by at least an offset.

The threshold and offset are configurable constants set by the network. An offset may be included to avoid a ping-pong scenario (i.e., events 2 and 4 are not triggered unless a CSI-RS resource becomes sufficiently better/worse than a benchmark). For example, the network may configure the offset to be a constant of about 3 dB.

The offset in Events 2 and 4 may or may not be the same offset. Furthermore, in Event 2 and Event 4, the CSI-RS resource in List B and List A respectively (sometimes referred to as a benchmark resource) may be any CSI-RS resource in a list. Alternatively, a benchmark resource may be a specific resource in the list (e.g., a resource designated by the network) or a CSI-RS resource within a list having the worst, best, or median measurement result. For example, the benchmark resource for Event 2 may be selected as the CSI-RS resource within List B with the worst measurement result, while the benchmark resource for Event 4 may be selected as the CSI-RS resource within List A with the best measurement result.

When a triggering event is met (e.g., Events 1-4), the UE prepares a measurement report and signals the report to the network. The UE may include in the measurement report RSRP measurement results of all the elements in the CRM set, List A, and/or List B. Alternatively, the measurement report may only contain the RSRP measurement results of a subset of elements in the CRM set, List A, and/or List B. For example, if a particular RSRP measurement result on a resource R1 triggered the measurement reporting (e.g., the result met one of the triggers defined in Event 1-Event 4), the UE may prepare a measurement report that contains only the result of resource R1.

The elements of List A and List B may include time-frequency resources (e.g., CSI-RS resources), and the UE performs the first type of network measurement (e.g., RSRP measurements) for each resource in both lists. Generally, List B is related to CoMP measurement set, but is not necessarily the same as the CoMP measurement set. Furthermore, unlike a CoMP measurement set, the second type of network measurement (e.g., CSI measurements) need not be made for the resources in List B. In alternative embodiments, the elements of List A and List B may include MCEs, resource IDs, resources, combinations thereof, or the like. The general principles of configuring triggering events remain the same.

In an embodiment, List B may be selected as the set of resources which corresponds to the MCEs measured in CoMP measurement set individually or jointly. For example, assume the CoMP measurement set includes resource M1 (corresponding to MCE1+MCE2+MCE3) and resource M2 (corresponding to MCE4). MCE1, MCE2, MCE3 and MCE4 are the MCEs that were measured in CoMP measurement set individually or jointly. List B may be configured to include resources B1 (corresponding to MCE1), B2 (corresponding to MCE2), B3 (corresponding to MCE3), and B4 (corresponding to MCE4). In the above example, M2 and B4 may be configured by the network to be the same CSI-RS resource.

Alternatively, List B may be selected as the resources in CoMP measurement set plus the set of resources which corresponds to those minimum communication elements that were measured in CoMP measurement set individually or jointly. For example, assume the CoMP measurement set includes resource M1 (corresponding to MCE1+MCE2+MCE3) and resource M2 (corresponding to MCE4). List B may be configured to include resources M1 (corresponding to MCE1+MCE2+MCE3), M2 (corresponding to MCE4), B1 (corresponding to MCE1), B2 (corresponding to MCE2), and B3 (corresponding to MCE3).

Generally, List A is closely related to CRM set and CoMP measurement set, but is not necessarily the elements of the CRM set minus the CoMP measurement set.

In an embodiment, List A may be the set of CSI-RS resources in the CRM set minus the CSI-RS resources corresponding to MCEs in the CoMP measurement set individually or jointly. For example, assume the CoMP measurement set includes resource M1 (corresponding to MCE1+MCE2+MCE3) and resource M2 (corresponding to MCE4). Then MCE1, MCE2, MCE3, and MCE4 are the MCEs measured in CoMP measurement set either individually or jointly. Also assume the CRM set includes CSI-RS resources R1 (corresponding to MCE1), R2 (corresponding to MCE2), R3 (corresponding to MCE_3), R4 (corresponding to MCE), R5 (corresponding to MCE5), and R6 (corresponding to MCE_6). M2 and R4 may be the same CSI-RS resource, if configured by the network. List A may be chosen as R5 (corresponding to MCE_5) and R6 (corresponding to MCE_6).

In an alternative embodiment, List A may be the set of CSI-RS resources in the CRM set minus the CSI-RS resources corresponding to MCEs in the CoMP measurement set individually or jointly, plus other CSI-RS resources corresponding to certain combinations of the MCEs measured in CRM set. For example, assume the CoMP measurement set includes resource M1 (corresponding to MCE1+MCE2+MCE3) and resource M2 (corresponding to MCE4). Also assume, the CRM set includes CSI-RS resources R1 (corresponding to MCE1), R2 (corresponding to MCE2), R3 (corresponding to MCE_3), R4 (corresponding to MCE), R5 (corresponding to MCE5), and R6 (corresponding to MCE_6). The MCEs measured in the CRM set are MCE1, MCE2, MCE3, MCE4, MCE5 and MCE6. List A may be configured to include resources R5 (corresponding to MCE5), R6 (corresponding to MCE6), R7 (corresponding to MCE5+MCE6+MCE1), and R8 (corresponding to MCE5+MCE6+MCE2).

The above examples regarding the elements of a CoMP measurement set, CRM set, List A, and List B are given for illustrative purposes only. The actual elements of these sets and lists may vary depending on the network configuration.

When the network receives a CSI-RS based measurement report triggered by Events 1-4, the network may manage the CoMP measurement set accordingly (e.g., step 210 of FIG. 2). That is, the network may add a resource to the CoMP measurement set, remove a resource from the CoMP measurement set, or reconfigure a resource in the CoMP measurement set. Additionally, the network may manage List A and List B in accordance with the measurement report and the updated CoMP measurement set. Furthermore, the network signals the elements of List A and List B to the UE as part of UE configuration (e.g., step 202 of FIG. 2), and the network may also signal information on the specific MCEs to be measured in List A and/or List B and/or CoMP measurement set.

For example, assume Event 1 is triggered because of resource A1, corresponding to MCE1, in List A. Upon receiving the measurement report, the network may decide to add a resource (e.g., A1) to the CoMP measurement set to obtain a CSI measurement of MCE1. Alternatively, the network may decide to reconfigure an existing resource (e.g., A2 corresponding to MCE2) of the CoMP measurement set to now correspond to MCE1+MCE2 (i.e., A2 now corresponds with MCE1+MCE2). Under either case, the network may decide to remove resource A1 from List A and either add resource A1 to List B (the previous case) or reconfigure resource A2 of List B (the latter case).

List A and List B are not required to be exclusive of the other in terms of the MCEs that were measured in each list individually or jointly, although the CSI-RS resources in each list may be exclusive.

For example, assume the CoMP measurement set includes resource M1 (corresponding to MCE1+MCE2+MCE3) and resource M2 (corresponding to MCE4), and the CRM set includes resources R1 (corresponding to MCE1), R2 (corresponding to MCE2), R3 (corresponding to MCE3), R4 (corresponding to MCE4), R5 (corresponding to MCE5), and R6

(corresponding to MCE6). Then, according to the above embodiments, List A may include resources R5 (corresponding to MCE5), R6 (corresponding to MCE6), R7 (corresponding to MCE5+MCE6+MCE1), and R8 (corresponding to MCE5+MCE6+MCE2). List B may include resources B1 (corresponding to MCE1), B2 (corresponding to MCE2), B3 (corresponding to MCE3), and B4 (corresponding to MCE_4). Then the MCEs measured in List A are MCE1, MCE2, MCE5, and MCE6 while the MCEs measured in List B are MCE1, MCE2, MCE3, and MCE4. MCE1 and MCE2 are measured in both lists, and the MCEs measured in List A and List B are not exclusive.

Typically, the second type of network measurement (e.g., CSI measurements) is not required for each resource in List B because List B is separate from the CoMP measurement set. However, the network may receive CSI-RS based measurement reports of the first type of network measurement (e.g., RSRP measurements) for CoMP measurement set management by properly configuring triggering Events 1-4 and List B/List A. More specifically, for the purpose of events triggering condition evaluation, RSRP measurements of MCEs measured in the CoMP measurement set (represented by list B) may be compared with other MCEs in the CRM set (represented by list A) without triggering the additional need for more expensive CSI measurements. Furthermore, although the number of resources in the CoMP measurement set is limited (e.g., a typical CoMP measurement set only contains two or three resources), List B is not subject to the same limitations. This allows the UE and network greater flexibility in managing the CoMP measurement set through configurations of List A and List B.

In an embodiment, List A and List B may be signalled as separate lists. In alternative embodiment, List A and List B may be provided in one joint list. For example, List A and List B may be signalled as a list of resources of which RSRP needs to be measured (e.g., the CRM set) while adding a flag/field for each resource indicating whether the resource belongs to List A or List B. Because of the close relationship between List B and CoMP measurement set, an embodiment may also provide List B and CoMP measurement set in a joint list, with added flag(s)/field(s) for each resource indicating whether CSI and/or RSRP measurement need to be made for the resource.

Various embodiments provide flexibility for measurement report triggering configuration for CoMP measurement set management. Various embodiments provide clear definitions of measurement events and measurement report triggers. Various embodiments provide a potential separation of RSRP measurements and CSI measurements for MCEs of CoMP measurement set when necessary through the introduction of List B and List A.

Figure 3:
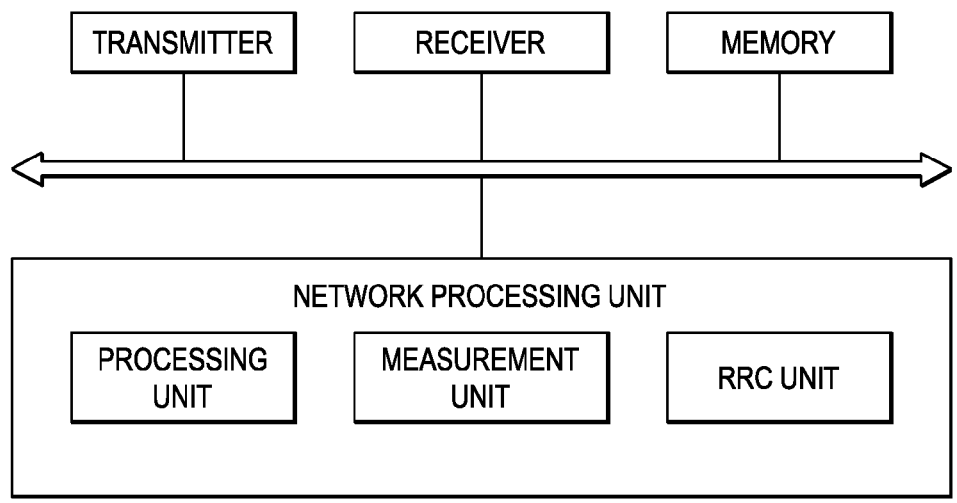
FIG. 3 is a block diagram illustrating a computing platform that may be used for implementing, for example, the devices and methods described herein, in accordance with an embodiment.

FIG. 3 is a block diagram of a processing system that may be used for implementing the systems and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may be an implementation of a network entity (e.g., eNodeB, UE), or part of an existing network entity.

As shown in FIG. 3, a transmitter is configured to transmit information and a receiver is configured to receive information. The transmitter and receiver may have a wireless interface, a wireline interface, or a combination thereof. In practice, the transmitter and receiver might be implemented in a single unit of hardware.

A processing unit is configured to process data and/or control messages exchanged between network entities, e.g., between eNodeB and UE(s). For example, RRC messages on measurement reporting configuration may be processed by the processing unit and then directed to RRC unit and/or measurement unit accordingly. In addition, the processing unit may be capable of interacting with PHY, MAC, RLC and/or PDCP entities, or performing the functionalities of PHY, MAC, RLC and/or PDCP entities.

A measurement unit is configured to perform the measurement of connection condition between UE and network, e.g., radio channel condition and/or received signal quality, and generate measurement reports when needed/configured.

A radio resource control (RRC) unit is configured to perform the functionalities of a RRC entity.

The elements of a network processing unit may be implemented as specific hardware logic blocks. In an alternative, the elements of the processing system may be implemented as software executing in a processor, microprocessor, digital signal processor, controller, application specific integrated circuit, or so on. In yet another alternative, the elements of the processing system may be implemented as a combination of software and/or hardware.

The memory may comprise any type of transitory or non-transitory system memory and/or mass storage device, such as static random access memory (SRAM), dynamic random access memory (DRAM), synchronous DRAM (SDRAM), read-only memory (ROM), a solid state drive, hard disk drive, a magnetic disk drive, an optical disk drive. The memory may be configured to store data, programs, and other information and to make the data, programs, and other information accessible to the network processing unit.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for multiple point communication comprising:
configuring, by a network device, a multiple point communication measurement reporting scheme for a user equipment (UE), wherein the multiple point communication measurement reporting scheme includes:
a multiple point communication measurement set;
a List A;
a List B; and
one or more measurement report triggering events, wherein each of the one or more measurement report triggering events is one of:
a first event wherein a measurement result of a first element in the List A becomes better than a first threshold;
a second event wherein a measurement result of a second element in the List A becomes better than a measurement result of a third element in the List B by at least a first offset;
a third event wherein a measurement result of a fourth element in the List B becomes worse than a second threshold; or
a fourth event wherein a measurement result of a fifth element in the List B becomes worse than a measurement result of a sixth element in the List A by at least a second offset, wherein the UE is configured to perform a first type of network measurement on elements in the List A and the List B and a second type of network measurement on elements in the multiple point communication measurement set, the first type of network measurement being different from the second type of network measurement.

2. The method of claim 1, wherein configuring the multiple point communication measurement reporting scheme further comprises signaling, to the UE, any of the following: the one or more measurement triggering events, the first threshold, the second threshold, the first offset, the second offset, the List A, the List B, the multiple point communication measurement set, or combinations thereof.

3. The method of claim 2, wherein the signaling comprises using radio resource control (RRC) signaling.

4. The method of claim 2, wherein configuring the multiple point communication measurement reporting scheme comprises signaling the List A and the List B as a joint list, wherein the joint list includes a field for each element indicating whether the respective element belongs in the List A or the List B.

5. The method of claim 2, wherein configuring the multiple point communication measurement reporting scheme comprises signaling the multiple point communication measurement set and the List B as a joint list, wherein the joint list includes a field for each element indicating whether the first type of network measurement, the second type of network measurement, or a combination thereof should be performed for each respective element.

6. The method of claim 1, wherein the third element in the List B is a specific element in the List B or an element in the List B having a best, a worst, or a median measurement result.

7. The method of claim 1, wherein the sixth element in the List A is a specific element in the List A or an element in the List A having a best, a worst, or a median measurement result.

8. The method of claim 1, wherein the elements in the multiple point communication measurement set, the List A, and the List B are a plurality of time-frequency resources, resource IDs, minimum communication elements (MCEs), channel state indication reference signals (CSI-RSs), or combinations thereof.

9. The method of claim 1, further comprising receiving, by the network device, a measurement report when one of the one or more measurement triggering events occur.

10. The method of claim 8, further comprising managing the multiple point communication measurement set, the List A and the List B in accordance with the measurement report.

11. The method of claim 10, wherein managing the multiple point communication measurement set comprises adding an element to the multiple point communication measurement set, removing an element from the multiple point communication measurement set, reconfiguring an element in the multiple point communication measurement set, or combinations thereof.

12. The method of claim 1, wherein the first type of network measurement is a reference signal received power (RSRP) measurement and the second type of network measurement is a channel state information (CSI) measurement.

13. The method of claim 1, wherein the list A, the list B, and the multiple point communication measurement set comprise a first, second, and third plurality of elements respectively, wherein each element in the first, second, and third plurality of elements correspond to one or more minimum communication elements (MCEs).

14. The method of claim 13, further comprising including in the List B a set of elements corresponding to minimum communication elements (MCEs) measured in the multiple point communication measurement set either individually or jointly.

15. The method of claim 13, further comprising including in the List A a set of elements corresponding to minimum communication elements (MCEs) measured in a multiple point communication resource management set that are not measured in the multiple point communication measurement set either individually or jointly.

16. A network device comprising:
a processor; and
a non-transitory computer readable storage medium storing programming for execution by the processor, the programming including instructions to:
configure a multiple point communication measurement reporting scheme for a user equipment (UE), wherein the multiple point communication measurement reporting scheme includes a multiple point communication measurement set, a List A, a List B, and one or more measurement report triggering events, wherein each of the one or more measurement triggering events is one of:
a first event wherein a measurement result of a first element in the List A becomes better than a first threshold;
a second event wherein a measurement result of a second element in the List A becomes better than a measurement result of a third element in the List B by at least a first offset;
a third event wherein a measurement result of a fourth element in the List B becomes worse than a second threshold; or
a fourth event wherein a measurement result of a fifth element in the List B becomes worse than a measurement result of a sixth element in the List A by at least a second offset,
and wherein the UE is configured to perform a first type of network measurements on elements in the List A and the List B and a second type of network measurements on elements in the multiple point communication measurement set, the first type of network measurements being different from the second type of network measurements.

17. The network device of claim 16, wherein the list A, the list B, and the multiple point communication measurement set comprise a first, second, and third plurality of elements respectively, wherein each element in the first, second and third plurality of elements correspond to one or more minimum communication elements (MCEs).

18. A method for multiple point communication comprising:
performing, by a user equipment (UE), a first type of network measurement on a first and second plurality of elements in a List A and a List B respectively;
performing, by the UE, a second type of network measurement on a third plurality of elements in a multiple point communication measurement set, wherein the first type of network measurement is different from the second type of network measurement; and
transmitting, to a network device, a measurement report including one or more results of the first type of network measurement when a measurement report triggering event occurs, wherein the measurement report triggering event is one of:
a first event wherein a measurement result of a first element in the List A becomes better than a first threshold;

a second event wherein a measurement result of a second element in the List A becomes better than a measurement result of a third element in the List B by at least a first offset;

a third event wherein a measurement result of a fourth element in the List B becomes worse than a second threshold; or a fourth event wherein a measurement result of a fifth element in the List B becomes worse than a measurement result of a sixth element in the List A by at least a second offset.

19. The method of claim 18, wherein performing the first type of measurement comprises performing a reference signal received power (RSRP) measurement.

20. The method of claim 18, wherein performing the second type of measurement comprises performing a channel state information (CSI) measurement.

21. The method of claim 18, further comprising receiving, by the UE, configuration information from a network device, wherein the configuration information includes any of the following: the List A, the List B, the multiple point communication measurement set, the one or more measurement report triggering events, the first threshold, the second threshold, the first offset, the second offset, or combinations thereof.

22. The method of claim 21, wherein receiving configuration information from the network device comprises receiving configuration information using radio resource control (RRC) signaling.

23. The method of claim 18, wherein each element in the first, second, and third plurality of elements correspond to one or more minimum communication elements (MCEs).

24. A user equipment (UE) comprising:
a processor; and
a non-transitory computer readable storage medium storing programming for execution by the processor, the programming including instructions to:
perform a first type of network measurements on a first and second plurality of elements in a List A and a List B respectively;
perform a second type of network measurement on a third plurality of elements in a multiple point communication measurement set, wherein the first type of network measurement is different from the second type of network measurement; and
transmit, to a network device, a measurement report including one or more results of the first type of network measurement when a measurement report triggering event occurs, wherein the measurement report triggering event is one of:
a first event wherein a measurement result of a first element in a List A becomes better than a first threshold;
a second event wherein a measurement result of a second element in the List A becomes better than a measurement result of a third element in a List B by at least a first offset;
a third event wherein a measurement result of a fourth element in the List B becomes worse than a second threshold; or
a fourth event wherein a measurement result of a fifth element in the List B becomes worse than a measurement result of a sixth element in the List A by at least a second offset.

25. The UE of claim 24, wherein each element in the first, second, and third plurality of elements correspond to one or more minimum communication elements (MCEs).

* * * * *